Jan. 8, 1935.  R. B. FREAS  1,986,886

HEATING APPARATUS

Filed July 11, 1930  3 Sheets-Sheet 1

INVENTOR
Royal B. Freas
BY
Emery, Booth, Varney & Whittemore
ATTORNEYS

Jan. 8, 1935.　　　　　R. B. FREAS　　　　　1,986,886
HEATING APPARATUS
Filed July 11, 1930　　　3 Sheets-Sheet 2

INVENTOR
Royal B. Freas
BY
Emery, Booth, Varney & Whittemore
ATTORNEYS

Jan. 8, 1935.  R. B. FREAS  1,986,886
HEATING APPARATUS
Filed July 11, 1930  3 Sheets-Sheet 3
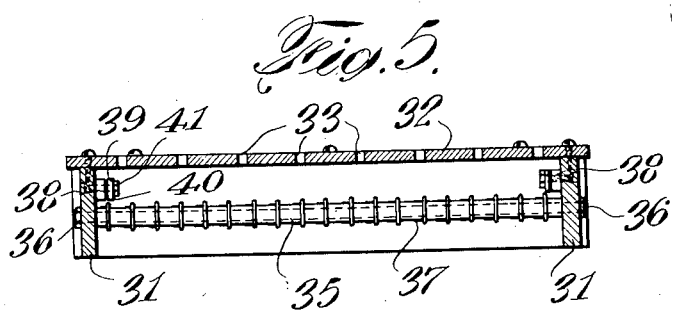
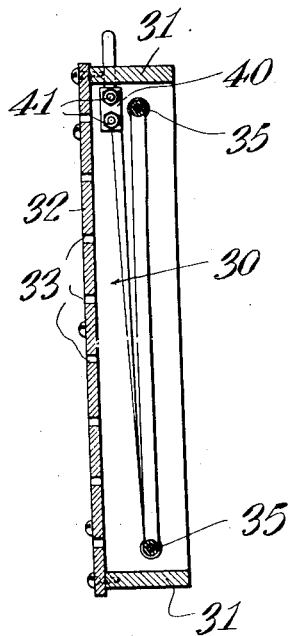
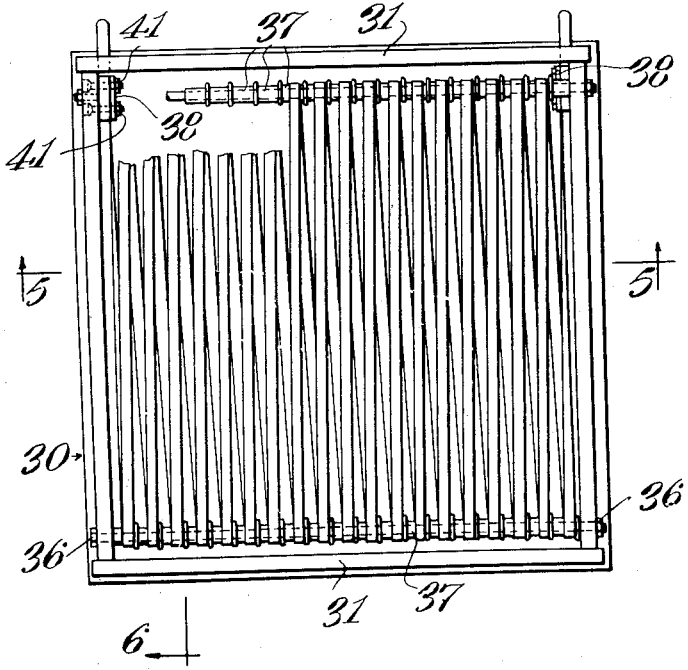
INVENTOR
Royal B. Freas
BY
Emery, Booth, Varney & Whittemore
ATTORNEYS Patented Jan. 8, 1935

1,986,886

UNITED STATES PATENT OFFICE 1,986,886

HEATING APPARATUS

Royal B. Freas, Leonia, N. J.

Application July 11, 1930, Serial No. 467,199

3 Claims. (Cl. 219—35)

This invention relates to heating apparatus, particularly to heating chambers or cabinets and heating units therefor, and has for an object the attainment of temperatures of practical uniformity at all useful points within the chamber at all times.

The chambers or cabinets with which the present invention is particularly concerned are those in which air or other gaseous fluids, hereinafter referred to as the gas, form the heat transmitting agent from the heating unit to the objects to be heated, such as ovens, dryers, low temperature furnaces, air baths, incubators, germinators, kilns, sterilizers and the like which are employed either in laboratories or for commercial processes.

When a single small object is placed in a heating cabinet the chief concern is to keep the temperature in the cabinet uniform in point of time. Assuming that there are no appreciable fluctuations of movement in the gas confined in the cabinet, there will in present common heating cabinets still be fluctuations (time variations) in temperature even with a heat regulating thermostat capable of operating for variations of plus or minus 1° F. because of the time lag of the heating unit used with the cabinet.

After the thermostat operates, the heating unit will not begin building up the temperature in the oven before it has had time to fall still lower; and likewise the temperature will continue to rise above the high point at which the thermostat stops the operation of the heating unit until the heating unit cools below the temperature of the oven. The present invention relieves this trouble by the provision of a heat reservoir of appropriate characteristics and disposition.

When a number of objects are placed in the cabinet the difficulties experienced with the cabinets and heating units are greatly increased. The principal additional problem involved is that of keeping all useful space within the cabinet heated uniformly throughout so that each unit space is substantially at the same temperature as every other unit space. This is most important when the material throughout the cabinet requires at all points therein an equal heating or when several specimens are to be compared after heating for an equal length of time or where specimens placed at random locations within the cabinet are tested after a given period of heating, assumed to be at a given temperature.

If the variations in temperatures at different points within the cabinet are as much as 18 or 20 degrees F.—as will hereinafter be shown to be the case by actual test with apparatus at present available—it will be realized that the specimens are not being subjected to the conditions which it is assumed they are and that the results obtained, whether for laboratory or commercial purposes, will be highly unsatisfactory. The present invention relieves this trouble by the provision of a heating unit of appropriate characteristics which is judiciously associated with the cabinet which it heats. The temperature dispersion (locational variations) has by this means been reduced to about 5° F. as will hereinafter be shown by data from actual operation and it is believed that further physical perfection along the lines of the present invention will reduce the dispersion still further.

In addition to maintaining a low dispersion and a low fluctuation of temperatures, provision must be made for introducing fresh air (or other gas) into the cabinet and removing spent gas and this, of course, must be done without upsetting the other desiderata involved. Further, the heating unit should be easily removed and inserted in the cabinet. These and other benefits accrue from the present invention.

In order to furnish a better understanding of the nature and objects of the invention an exemplary embodiment of the same will be described in connection with the accompanying drawings, in which:

Figure 5 is a vertical section taken on the line 5—5 of Figures 4 and 7;

Figure 6 is a vertical section taken on the line 6—6 of Figures 4 and 7; and

Figure 7 is a bottom plan view.

As illustrated, the present invention is particularly concerned with heating cabinets in which the heat transfer is effected primarily by convection, which involves a physical displacement of a body of gas. In some types of cabinets this displacement may be effected mechanically as by a fan or blower but more frequently in cabinets of the class at present considered the displacement is effected by natural convection which depends on the difference in density between units of gas at different temperatures. That is to say, the density of warmed gas decreases directly with its increase in temperature, and the warmed gas rises due to displacement by the colder gas which descends due to the greater pull of gravity.

But small volumes of gas must be considered. Due to the fact that the internal thermal conductivity of gas is relatively very low, the change in density will first occur in a thin layer or film which is directly in contact with or located nearest to the heating medium. This layer then tends to rise because of its decreased density and small inertia, or as is more often said, the colder and denser gas which was located at a distance from the heating medium tends to force the warmer lighter gas upward. If the heating medium has a flat surface which is disposed horizontally the warm layer of gas will tend to move upward as an unbroken layer over the entire upper surface of the heating medium while the colder heavier gas tends to move inward along the surface of the heating medium from its outer edges.

In order that the heat transfer shall be uniform, the velocity of the displacement must be uniform which means that the heating of each unit volume of gas over the entire area of the heating surface (here assumed to be horizontal) must be uniform. To produce this result, the heat from the source of heat might theoretically be evenly applied to the entire heat transmitting surface. Actually this cannot be accomplished with any known heating means. A flame is quite impractical. Electrical resistance heating elements are of known means the most practical and moreover, electrical energy input can be closely controlled. So electrical resistance heating elements are here employed and their disposition has been so planned that they will as nearly as is possible produce a uniform temperature over the entire surface to be heated.

But further to insure that there will be uniform heating over the entire surface, a heating plate of high internal thermal conductivity such as copper is employed. So if one spot or point of the plate becomes more highly heated by the heating means than an adjacent spot or point, the excess heat will quickly diffuse to the colder spot and produce an effective gas heating surface which is practically uniformly heated throughout.

To dampen fluctuations of heat within the body of gas within the chamber the plate has a great heat capacity so as to act as a substantial reservoir of heat.

Figure 1:
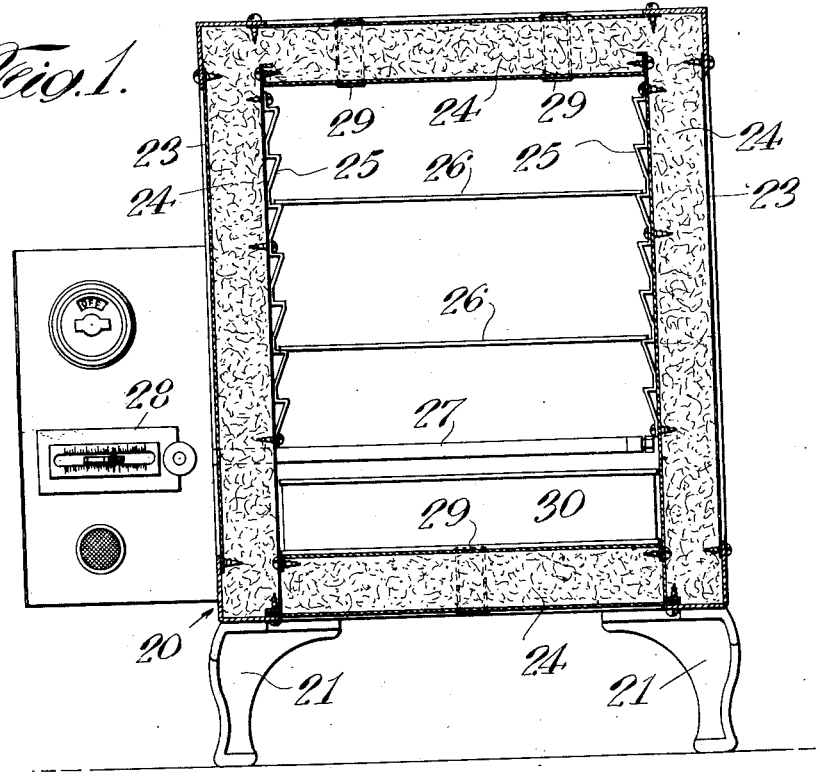
Figure 1 is a vertical section of a cabinet of the oven type embodying the invention, the view being taken on the line 1—1 of Figure 2 and showing the heating unit and heat controls in elevation.
Figure 2:
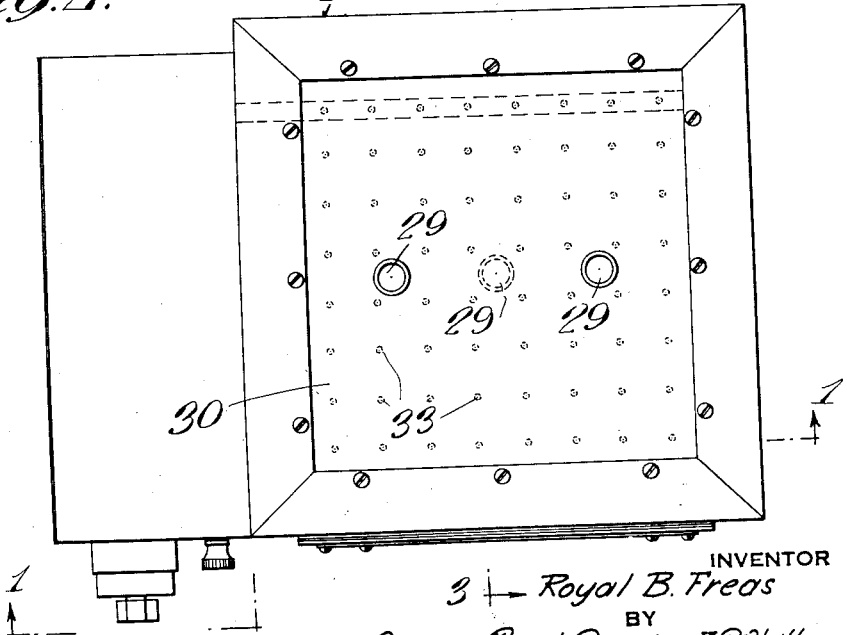
Figure 2 is a top plan view.
Figure 3:
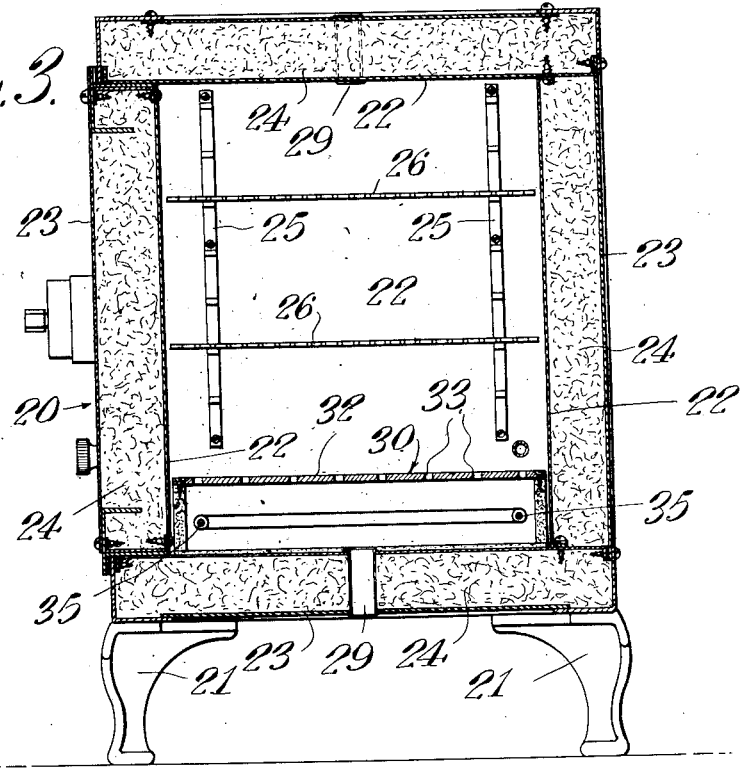
Figure 3 is a vertical section taken on the line 3—3 of Figure 2.
Figure 4:
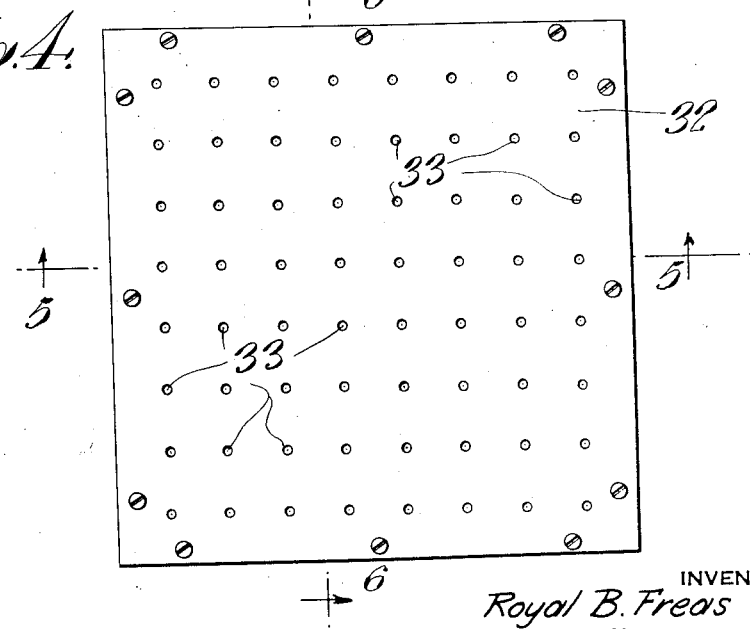
Figure 4 is a top plan view of the heating unit alone.

In the drawings (Figs. 1 to 3) the cabinet, generally designated by the numeral 20, rests upon legs 21. The walls of the cabinet comprise interior metal plates 22, exterior metal plates 23 and insulation 24 of magnesia and asbestos fire felt. Interiorly, the cabinet is provided with shelf brackets 25 and foraminiferous article-holding shelves 26 disposed thereon. As shown in Fig. 1 a heating unit generally designated by the numeral 30 is disposed on the bottom of the cabinet chamber and closely thereabove there is a bi-metallic or other thermostat 27 which extends to the left into association with an indicator 28. Air ducts 29 are shown extending through the bottom and top walls of the cabinet.

The heating unit is formed as a complete enclosure except at the bottom which is open to receive fresh air through the opening 29. By this arrangement all of the entering air is made to pass directly through the heating unit before it can reach the interior of the cabinet, so there will be no appreciable eddy currents set up within the body of air within the cabinet. To this end the heating unit includes a frame formed of vertical plates 31 of iron, asbestos board or similar rigid material, preferably the latter so as to avoid localization of highly conductive masses along the top plate 32 which is secured above the frame formed of the plates 31.

The plate 32 is, as stated above, formed of a material of high thermal diffusivity and of considerable mass per unit of volume. Preferably copper which has these characteristics, and which additionally has as a desirable characteristic a high heat capacity per unit of volume, is used. For a given cubic volume copper has a greater heat capacity than any material known except a few of the rarer metals such as gold and platinum which are prohibitive on account of their cost. The plate here employed is about $\frac{3}{16}''$ thick. The frame with the copper plate closely fits the interior of the cabinet.

The plate 32 is provided with a plurality of uniformly spaced holes 33 which are quite small, all of them together approximately equaling the area of the outlet opening 29 in the top wall of the cabinet. By having a plurality of small holes, the flow of air from the resistance coils is broken up and admitted as uniformly as possible over the horizontal area of the oven.

Secured across the frame are two spaced circular rods 35 held in place by nuts 36.

Upon these rods are loosely mounted cylindrical insulating spools 37 and over these spools is wrapped a number of turns of flat resistance wire. By this arrangement an even distribution of heat below the plate is secured. The wire is secured at either end to a plug 38 so the unit will be energized by pushing the plugs into mating sockets when the unit is inserted in the cabinet. As shown, the wire is secured between a flattened portion 39 of a plug 38 and a mating plate 40 by bolts 41 which also pass through one of the side plates 31 of the frame to mount the plug thereon. Instead, if desired the wire may be welded to the plug.

The heating coil is spaced a sufficient distance below the plate 32 to permit free movement of gas currents therebetween as well as to conform to the requirements of good electrical design. In the present illustrative embodiment this spacing is one and one-eighth inches.

The mass of the structural elements in contact with the hot wire is kept relatively low, so that the quantity of heat which will be dissipated when the thermostat cuts off the further inflow of energy will be small.

The plate 32 by being of high diffusivity and acting as a heat reservoir gives uniform heat to the cabinet which is important since the heating coil undergoes wide variations in temperature due to sudden heating and cooling necessary to obtain control by the thermostat. Also the rapid absorption of heat by the plate prevents overheating of the coil.

In operation, the plate spreads the heat uniformly across the cabinet and gives a practically uniform temperature at all points thereabove. Further, by acting as a reservoir the plate reduces fluctuations in temperature with the result that the temperature is more uniform over a given period of time than obtained in other cabinets. The cold air entering the bottom of the cabinet first meets the heating element which heats it and produces a circulation below the plate 32 and only a small amount of heated air is admitted to the cabinet through the small holes in the plate.

The results of comparative tests show that the temperatures obtained by prior heating apparatus, even when associated with a good type of oven, varied so widely as to make results and data obtained entirely unreliable, whereas the apparatus according to the present invention has brought the variations to such narrow limits that quite satisfactory results may be obtained.

While one preferred embodiment of the invention has been particularly illustrated and described, it is to be understood that various changes and modifications may be made within the scope of the subjoined claims.

What I claim is:

1. In heating apparatus, in combination, an enclosed insulated cabinet provided with apertures in the bottom and top walls thereof, a heating unit disposed at the bottom within said cabinet, said unit including an enclosing frame closely fitting within the side walls of said cabinet and open at the bottom to surround the bottom aperture in said cabinet, a top plate closely fitting upon said frame and with the side walls of the cabinet, said plate being provided with a plurality of small holes spaced over the entire surface thereof, round rods extending across said frame near opposite sides thereof and below said top plate, cylindrical insulating spools mounted on said rods, flat resistance wire wound about said spools with the plane of the wire disposed parallel to the plane of said top plate, said wire being uniformly spaced beneath and covering the major portion of the surface of the top plate, and terminal plugs on the rear side of said unit to which the ends of said wire are connected whereby the unit is electrically connected when pushed into said cabinet, said top plate being formed of a material of high thermal diffusivity, high density and having great heat capacity per unit of volume, for the purposes described.

2. In heating apparatus, in combination, an enclosed insulated cabinet provided with apertures in the bottom and top walls thereof, a heating unit disposed within said cabinet, said unit including enclosing side walls of asbestos board resting on the bottom of the cabinet near the side walls thereof, and surrounding the bottom aperture, a copper plate closely fitting upon said frame and with the side walls of the cabinet, said plate being provided with a plurality of holes distributed over the entire surface thereof, parallel rods extending across said frame near opposite sides thereof and below said top plate, insulating devices mounted upon said rods, and flat nickel-chromium resistance wire wrapped about said insulators with the flat surface parallel to the surface of the top plate, said wire being uniformly spaced and covering most of the surface of the top plate.

3. In heating apparatus, in combination, a heating cabinet, a heating unit therein closely fitting the side walls thereof, said unit including an enclosed frame resting on the bottom of the cabinet, means for admitting a heating gas beneath said frame, a relatively thick plate of a material of high thermal diffusivity and high heat capacity per unit of volume resting on the frame, said plate being provided with openings to permit the upflow of heating fluid from beneath the frame and a heating element disposed below and uniformly distributed over substantially the entire surface extent of said plate.

ROYAL B. FREAS.